United States Patent [19]

Schuster et al.

[11] Patent Number: 4,889,897

[45] Date of Patent: Dec. 26, 1989

[54] OXIDATION OF POLYETHYLENE

[75] Inventors: Ludwig Schuster, Limburgerhof; Albert Hettche, Hessheim; Werner Liedy, Hochdorf-Assenheim; Stefan Weiss, Neckargemuend; Leo Ehemann, Roedersheim-Gronau, all of Fed. Rep. of Germany

[73] Assignee: BASF Aktiengesellschaft, Ludwigshafen, Fed. Rep. of Germany

[21] Appl. No.: 206,663

[22] Filed: Jun. 15, 1988

[30] Foreign Application Priority Data

Jun. 25, 1987 [DE] Fed. Rep. of Germany ....... 3720952

[51] Int. Cl.$^4$ ............................................. C08F 8/06
[52] U.S. Cl. .................................. 525/388; 525/333.8
[58] Field of Search ......................................... 525/388

[56] References Cited

U.S. PATENT DOCUMENTS

| 3,234,197 | 2/1966 | Baum | 525/388 |
|---|---|---|---|
| 3,293,112 | 12/1966 | Kehr . | |
| 3,322,711 | 5/1967 | Bush et al. . | |

FOREIGN PATENT DOCUMENTS

| 0951308 | 3/1964 | United Kingdom . |
|---|---|---|
| 0997135 | 7/1965 | United Kingdom . |
| 1087914 | 10/1967 | United Kingdom . |
| 1087915 | 10/1967 | United Kingdom . |

*Primary Examiner*—Christopher Henderson
*Attorney, Agent, or Firm*—Keil & Weinkauf

[57] ABSTRACT

Oxidized polyethylenes useful as water-emulsifiable waxes and as lubricants in the extrusion of polyvinyl chloride are prepared by oxidizing finely divided polyethylene of high density at elevated temperatures with an oxidation gas of air and/or oxygen, the oxidation gas supplied per hour containing not less the 100 mg of ozone per kilogram of polyethylene, by performing the oxidiation in a paddle dryer and passing the oxidation gas into the free gas space above the polyethylene, the temperature in the paddly dryer preferably being continuously adjusted to from 1° to 2° C. below the softening point of the polyethylene.

2 Claims, No Drawings

OXIDATION OF POLYETHYLENE

The present invention relates to a process for preparing oxidized polyethylenes having acid number of from 10 to 40 mg of KOH/g by oxidizing a finely divided polyethylene of high density at below the softening point of the polyethylene and above 100° C. with an oxidation gas of air and/or oxygen where the oxidation gas supplied per hour for contact with the polyethylene contains not less than 100 mg of ozone per kilogram of polyethylene.

Such processes give oxidized polyethylenes which find utility as water-emulsifiable waxes for polish and also as lubricants in the extrusion of polyvinyl chloride.

U.S. Pat. No. 3,292,112 and 3,322,711 and GB Pat. No. 1,087,915 disclose that polyethylenes can be oxidized by the action of free oxygen, oxidized products being obtained. This oxidation is in general carried out at temperatures just below the melting point of the polyethylene, on the one hand to obtain as high a rate of reaction as possible, but on the other to prevent sticking or clumping of the pulverulent product.

In these processes, an accelerant is used, in small amounts of for example from 0.05 to 5 % by weight, based on the polyethylene, to shorten the induction period and to raise the rate of oxidation. The accelerants proposed are organic peroxides, azobisisobutyronitrile, ozone or dinitrogen tetroxide. The peroxides should be convenience be dissolved in an organic solvent and be distributed over the polyethylene. The solvent is then evaporated off before the oxidation. This gives a uniform distribution of the peroxide in the polyethylene.

The prior art also discloses converting polyethylenes of high density with air in the presence of ozone into oxidized polyethylenes (cf. GB Pat. Nos. 951,308, 997,135 and 1,087,914).

The oxidation systems mentioned are: air through-circulation ovens, fluidized bed apparatus, hot moving beds, press-molding into sheet form and oxidizing in hot air, a rotating glass drum, and the oxidation in aqueous suspension with compressed air being passed through.

However, all these systems have serious disadvantages. For instance, before the oxidation in a fluidized bed, or for that matter in fluidized/moving arrangements, through-circulation ovens and sheet oxidation, the polyethylene to be oxidized must be pretreated with the starter in a separate system. With the other oxidation reactors, the peroxide must likewise be dissolved and distributed over the polyethylene, which in turn must then be dried by distilling off the solvent.

A more effective accelerant than peroxides is ozone in admixture with the oxidation gas. However, the existing processes additionally have the disadvantage that processing takes place in suspension of various media or in the melt, that the reaction times are too long, or that the products formed do not meet the specific requirements.

It is an object of the present invention to avoid the abovementioned disadvantages and to provide a process where the rate of oxidation is particularly strongly accelerated and any stickiness of the oxidation product is readily controllable.

We have found that this object is achieved with a process as described at the beginning for oxidizing polyethylene with an ozone-containing oxidation gas, which comprises, according to the invention, performing the oxidation in a paddle dryer and passing the oxidation gas into the free gas space above the polyethylene. In a preferred process according to the invention, the temperature in the paddle dryer is continuously adjusted to from one to two ° C. below the softening point of the polyethylene.

The oxidized polyethylenes obtained have acid numbers of from 10 to 40, preferably of from 10 to 30, mg of KOH/g. The acid numbers are obtained by titration in boiling xylene with methanolic or butanolic KOH against phenolphthalein, 1 g of oxidized polyethylene having been dissolved in from 100 to 200 g of xylene and the KOH solution being 1/10 normal. The oxidates obtained are usually light-colored heat-resistant waxes having a melting range of from 120 to 130° C. and melt indices, as measured by ASTM-D-1238-65T (190° C./2.16 kg), within the range of 0.1 to 7,000 g/10 min.

In the oxidation, a finely divided polyethylene of high density is used. For the purposes of the present invention, a finely divided polyethylene is a grainly, pulverulent or granular polyethylene having particle sizes within the range from 3 to 1,000, preferably from 300 to 800, micrometers. The polyethylene has a density of above 0.935 g/cm$^3$, in particular of from 0.94 to 0.97 g/cm$^3$ (by German Standard Specification DIN 53,479). The softening range of the polyethylene used is above 125° C., in particular within the range from 127 to 140° C.

The polyethylene of high density can for example have been obtained from ethylene by Ziegler polymerization processes or by using Phillips catalyst systems. Suitable polyethylenes of high density have for example a melt flow index of below 0.01 g/10 min, as measured by ASTM-D-1238-65T at 190° C. under a weight of 2.16 kg.

The oxidation temperatures are below the softening point of the particular polyethylene of high density and above 100° C., preferably above 120° C., in particular from 1 to 2° C. below the particular softening point of the polyethylene.

The oxidation gas consists of air and/or oxygen, the oxidation gas supplied per hour to the polyethylene containing not less than 100 mg, preferably from 150 to 500 mg, of ozone per kilogram of polyethylene. The concentration of ozone in the oxidation gas is not very critical according to the prior art, since substantially all the ozone is consumed in the reaction. Customary values vary within the range from 2 to 6 g/m$^3$.

The process according to the invention gives a useful oxidation product only on selecting a certain manner of gas contact which is realizable in a paddle dryer.

According to the invention, the oxidation reactor used is a paddle dryer. A paddle dryer comprises an externally heatable cylinder which lies on its side, on the longitudinal axis of which there is fitted a shaft equipped with outwardly directed paddles. Paddle dryers of this type are known and described in for example Ullmann's Encyklopadie der technischen Chemie, Verlag Chemie, Weinheim/Bergstr., 4th edition (1972), volume 2, page 714; Kirk-Othmer, Encyclopedia of Chemical Technology, Interscience Publishers New York, 2nd edition (1965), vol. 7, pages 370 to 371; or in Grundiss der Technischen Chemie by F. A. Henglein, Verlag Chemie Weinheim/Bergstr., 11th edition (1963) pages 114 to 115.

Slow rotation around the longitudinal axis of the shaft serves to circulate and mix the material to be oxidized in the reaction space. The direction of rotation may be one way only, but can also be alternatingly in the clockwise and counterclockwise direction.

Such a dryer is filled to from 60 to 70 % of its capacity with a dry polyethylene powder, and the powder is heated with rotation to the oxidation temperature, for example 128° C. According to the invention, an air stream which contains a small amount of ozone is then passed into the free gas space above the polymer. This way of introducing the gas is absolutely essential in order to obtain a product which on further processing is fully emulsifiable in aqueous sodium hydroxide solution under super-atmospheric pressure. This is because if, in the usual way, the ozone-containing air stream is introduced at the lowest point of the apparatus (to maximize the thickness of the layer through which the gas has to flow), then the resulting polyethylene oxidate is only incompletely emulsifiable. The emulsion thus produced is coarse and unstable: within a short time it separates off a particulate yellow top layer.

Since the majority of the prior art oxidation initiators only gave unsatisfactory results, whether because the oxidation rate is too low, or because the resulting products are qualitywise not up to the required standard, it is surprising and was not foreseeable that a measure which per se is not advisable, namely the mere passing over of a gas containing a small amount of another, reactive gas, would give a product having the desired properties in, what is more, a shorter reaction time.

A further advantage of the paddle dryer for this reaction is the novel finding that the sticking of the oxidation product at excessively high temperatures is very easy to control. GB Pat. No. 1,087,915 describes how the oxidation of solid polyethylene, which is fastest in the vicinity of the melting point, can be carried out without sticking or clumping by reducing the temperature in accordance with a fixed time-temperature program, for example by 1–1.5° C. per 2–2.5 hours. It is easy to see that with such a rigid program, even if worked out specifically for every type of polyethylene, every peroxide and every gas flow rate, the temperature can virtually never be maintained within the optimal range, ie. from 1 to 2° C. below the softening point, for a prolonged period. A paddle dryer makes it possible, by simply measuring the motor power required, to control the temperature in such a way that oxidation always takes place at from 1 to 2° C. below the softening point. This is because it turned out that in the vicinity of this softening point the power consumption of the motor which rotates the shaft increases steeply. This thus provides a sensitive indicator of the onset of clumping before there are any visual indications. This effects is highly utilizable as a control input for temperature regulation.

EXAMPLE

In a 160 liter (l) capacity paddle dryer, 44 kg of a polyethylene of density 0.946 g/cm$^3$ in powder form (particle size 3–800 micrometers) are heated. The stirrer shaft rotates at 30–40 r.p.m. First a shell temperature of 130° C. is applied. 6.8 m$^3$/hour of air and 1 m$^3$/hour of oxygen are passed in simultaneously at the front end into the top part of the free space above the churning polyethylene powder. This gas stream contains 3.6 g/m$^3$ of ozone. The temperature of the material to be oxidized is controlled by measuring the energy requirements of the stirrer motor in such a way as to keep the temperature at from 1 to 2° C. below the softening point. This softening point decreases during the oxidation from 128° C. to 122° C. 16 hours later an acid number of 21 has been obtained.

To test the emulsifiability the oxidate is emulsified in an autoclave in accordance with the following formulation:

A 1-l autoclave equipped with stirring and heating means is initially charged with (parts by weight):
150 parts of water
160 parts of oxidized polyethylene
3.5 parts of potassium hydroxide
1.2 parts of sodium bisulfite
42 parts of emulsifier (ethoxylated alkylphenol)

The temperature is raised with stirring to from 150° C. to 160° C. and then a further 230 parts of water are added. On cooling down a light-colored, transparent polyethylene sol free from fisheyes, is obtained.

COMPARISON

Example 1 is repeated, except for the sole difference that the gas is not passed into the free space above the polyethylene bed but is blown in low at the front end, ie. at the lowest point, so that the oxidation gas must pass through the stirred bed. The same period produces a product having the same acid number of 21.

On testing the product for emulsifiability it is then found that it does not produce a transparent sol but a milky emulsion which, within a very short time, separates off a particulate yellow top layer.

We claim:
1. A process for preparing an oxidized polyethylene having an acid number of from 10 to 40 mg of KOH/g which comprises:
   passing an oxidation gas into the free space of a horizontally disposed paddle dryer partially filled with finely divide,d high density polyethylene at a temperature below the softening point of the polyethylene and above 100° C., said paddle dryer including a rotatable longitudinal shaft along its axis to which outwardly directed paddles are attached, the oxidation gas containing sufficient ozone to provide not less than 100 mg of ozone per kilogram of polyethylene; and
   rotating the shaft and paddles to circulate the polyethylene particles below the free space of the paddle dryer occupied by the oxidation gas.
2. A process as claimed in claim 1, wherein the temperature in the paddle dryer is continuously adjusted to from 1 to 2° C. below the softening point of the polyethylene.

* * * * *